UNITED STATES PATENT OFFICE.

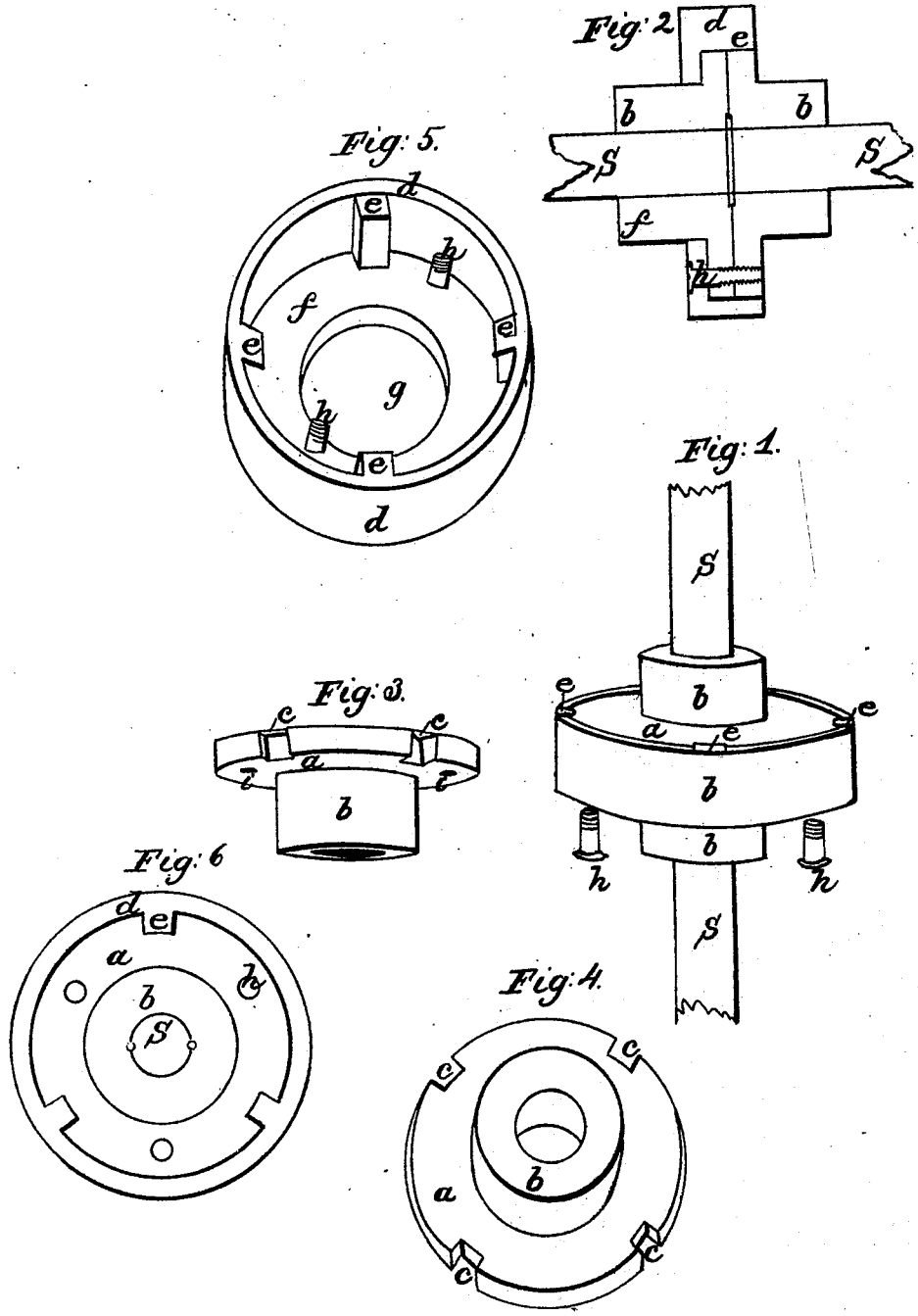

E. M. RICE, OF WORCESTER, MASSACHUSETTS.

COUPLING LINE-SHAFTS.

Specification of Letters Patent No. 5,241, dated August 14, 1847.

*To all whom it may concern:*

Be it known that I, EBENEZER M. RICE, of the town and county of Worcester and State of Massachusetts, have invented a new and useful Improvement in the Method of Coupling Shafts, and that the following is a full, clear, and exact description of the principle or character which distinguishes it from all other things before known and of the manner of making, constructing, and using the same, reference being had to the accompanying drawings, making part of this specification, in which—

Figure 1 is a perspective view of two shafts coupled together; Fig. 2, a longitudinal section of the same taken in the plane of the axis; Figs. 3 and 4 perspective views of the two coupling disks, flanges, or plates; Fig. 5, a perspective view of the coupling ring, and Fig. 6 a cross section taken through the coupling.

The same letters indicate like parts in all the figures.

In the mode of coupling shafts heretofore and now generally practised, one of the shafts, or a projection therefrom, is made to enter a recess in the other for the purpose of keeping them in the same central line, hence they cannot be uncoupled and disconnected without moving one of them endwise, which in most cases is highly objectionable, as for instance in the long line shafts used in factories and made in many sections, and each section running in its appropriate box or boxes, for when any one of the inner sections has to be removed for repairs, &c., all the sections beyond it, at one end must be moved endwise before this one section can be taken out on account of the projection of one into the other. But by my invention I avoid entirely this difficulty, which has long been recognized, particularly in large factories; and the nature of my invention consists in coupling shafts by means of a ring that fits over the periphery of the two flanges, disks or plates on the end of the two shafts, the ring being provided with longitudinal feathers to fit corresponding grooves in the periphery of the two flanges, disks, or plates, so that by simply sliding off the ring the two are disconnected and in this way any section of a shaft can be taken out without the necessity of moving the remaining portions of the shafting, as the projection of the one into the other is entirely avoided when this is combined with the mode of clamping together the two disks by means of screws that pass from a flange of the ring that rests against one of the disks, and tapped into the other disk, one of the disks being thus clamped between the flange of the embracing ring and the other disk, the screws passing through two parts and being tapped into the other or screw bolts passing through the three with nuts outside.

In the accompanying drawings (S S) represent two sections of the shafting on the end of each of which there is a hub (*b*) properly secured therein in the usual manner; and each of these hubs has a flange (*a*) forming a circular disk or plate concentric with the shaft, and with the face at right angles with the axis of the shaft. When the two shafts are in the same central line, that is when their axes coincide, the periphery of the two disks also coincide; grooves (*c, c, c, c*) are then cut into them in lines parallel with the axes of the shafts to receive feathers or fillets (*e, e, e, e*) that project from the inner periphery of a ring (*d*) that fits accurately and embraces the periphery of these two disks so that when this ring is over the two disks with the feathers in the grooves the two shafts are thoroughly coupled and must turn with each other and be thereby retained in the same central line; and by removing the ring, which is done by simply sliding it to one side, the two will be uncoupled.

One end of the ring (*d*) is provided with a flange (*f*) the inner periphery of which fits one of the hubs (*b*) so as to slide accurately thereon, and when the shafts are coupled this ring is secured in place by means of screws (*h, h, h, h*) that pass through the flange of the ring and one of the coupling disks and are tapped into the other to give additional strength to the coupling, and to secure the shafts together endwise, and to prevent sagging or getting out of line.

It will be obvious from the foregoing that the ring instead of having feathers fitting into grooves in the periphery of the two disks this may be reversed and the feather may be on the disks and fit in grooves in the inner periphery of the ring; and that instead of screws for securing the ring and the disks together and passing through the flange of the ring, other means of fastening may be substituted.

I do not claim as my invention merely coupling shafts together by means of disks or flanges on the end of the shafts, as this has long been known nor by the simple use of a sleeve that passes into the periphery of the parts coupled; but What I do claim as my invention and desire to secure by Letters Patent is—

The method of coupling shafts by means of the circular flanges, disks, or plates on the ends thereof and grooved or feathered on their periphery in lines parallel with the ring which fits onto the periphery of the flanges, disks, or plates, substantially as described in combination with the mode of clamping the two disks by screws passing through the two disks and the flange of the embracing ring whereby the projection of one shaft into the other as a means of keeping them in the same central line is obviated, as described, and at the same time the two shafts are clamped together endwise to prevent sagging and wabbling, as described.

EBENEZER M. RICE.

Witnesses:
Wm. H. Bishop,
A. P. Bowers.